Figure 1:
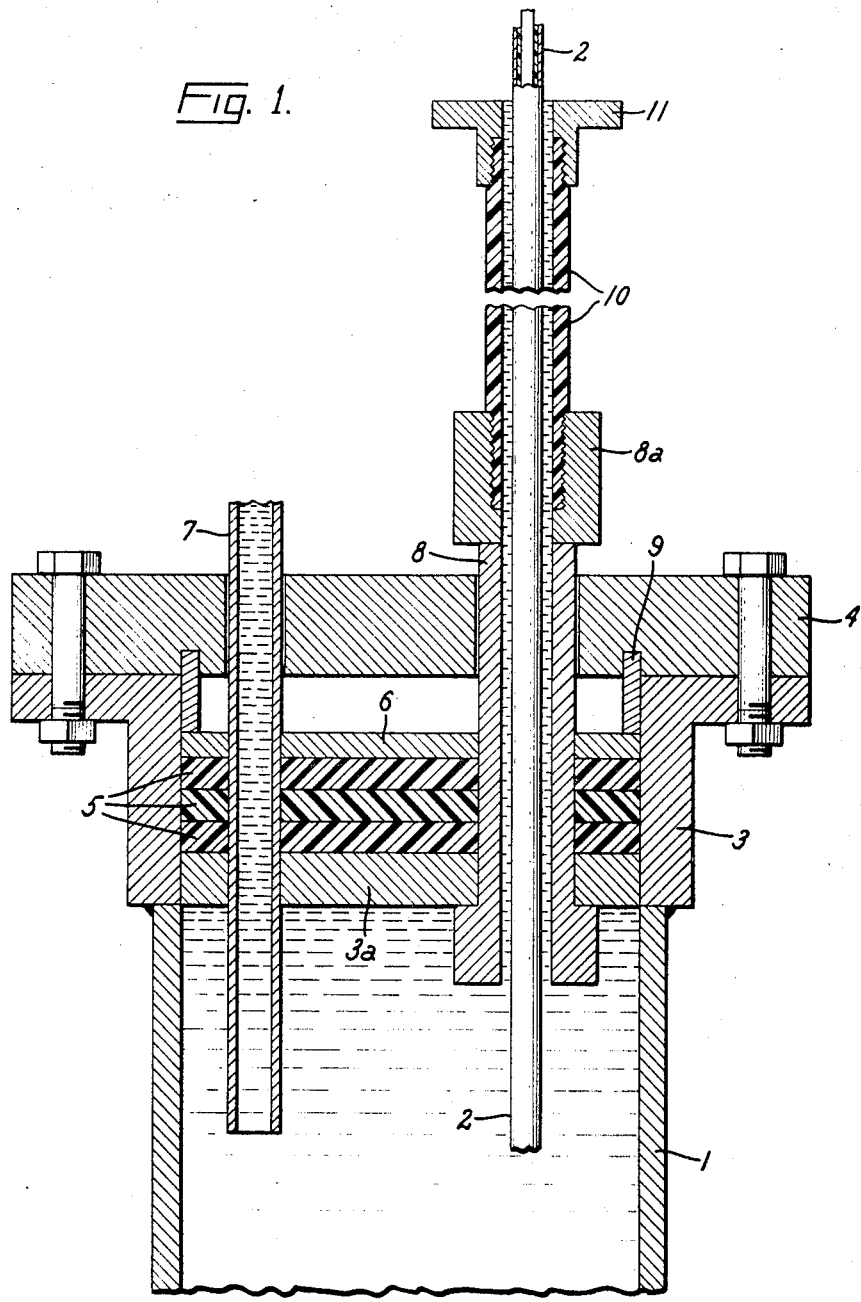

United States Patent [19]
Schneider et al.

[11] 3,739,073
[45] June 12, 1973

[54] TERMINATION FOR ELECTRIC CABLE AND FLUID FILLED CABLE CONDUIT

[75] Inventors: Harold N. Schneider, Springfield; J. Kenneth Wittle, Berwyn, both of Pa.

[73] Assignee: General Electric Company, Philadelphia, Pa.

[22] Filed: May 5, 1972

[21] Appl. No.: 250,658

[52] U.S. Cl............... 174/23 R, 166/65 R, 174/20, 174/77 R, 277/12
[51] Int. Cl............................................ H02g 15/04
[58] Field of Search .............. 174/18, 19, 20, 23 R, 174/77 R, 151; 166/65 R, 243; 277/4, 12, 103

[56] References Cited
UNITED STATES PATENTS

| | | | |
|---|---|---|---|
| 2,540,909 | 2/1951 | Pouzet | 174/20 |
| 2,881,241 | 4/1959 | Stecher | 174/20 X |
| 3,032,601 | 5/1962 | Diehl | 174/19 |

Primary Examiner—Laramie E. Askin
Attorney—J. Wesley Haubner, Frank L. Neuhauser, Oscar B. Waddell et al.

[57] ABSTRACT

An electric cable emerging from a liquid-filled chamber under pressure, such as a deep well casing, is led through a high pressure hose or other conduit to a self sealing terminator in which the conduit and cable sheathing is terminated and from which the cable conductors alone emerge. The terminator comprises a tubular shell having a sealed tubular piston therein and a closure cap at its outlet end. The pressure hose is connected to the incoming end of the terminator shell and the cable is led into and through the piston. All cable sheathing and armor is terminated at the piston and the cable conductors continue through the closure cap. A body of resilient sealing material between the piston and closure cap is compressed by fluid pressure on the piston to seal against the cable conductors.

8 Claims, 2 Drawing Figures

TERMINATION FOR ELECTRIC CABLE AND FLUID FILLED CABLE CONDUIT

Our invention relates to terminal apparatus for an electric cable and a fluid filled enclosing conduit, and particularly to termination of a long electric cable emerging from a water and/or oil filled chamber under high fluid pressure. The invention is specially applicable to above ground termination of an electric cable traversing a long fluid filled chamber or casing to transmit substantial amounts of electric energy to an underground location, as for certain oil well processes or equipment.

It is a general object of our invention to provide means for terminating an electric cable at a location remote in respect to or at its point of emergence from a high pressure fluid filled chamber.

It is another object of our invention to provide improved means for above ground termination of a long armored electric cable connected through a liquid filled well casing to equipment at an underground location.

It is a more particular object of our invention to provide an extended or remote self-sealing terminator for an electric cable and enclosing conduit emerging from a main liquid-filled chamber under pressure.

In carrying out our invention in one preferred embodiment we position high voltage electric apparatus in a deep bore hole having a casing through which an armored electric cable passes from above the earth's surface to the down-hole apparatus. The casing is sealed at its head with a pressure cap and is filled with conductive water or other electrolyte under high pressure to cool the electrode and to provide a current path between the electrode and the earth. Pressures contemplated in such a casing are of the order of 2,500 to 3,300 pounds per square inch. In such an application it is not desirable to terminate the cable directly at the casing cap, for if any fault, as due to high fluid pressure, develops at this point it is necessary to withdraw and replace the entire length of cable.

To terminate such en electric cable above ground level we bring it through the casing cap into an extended conduit, which may be flexible and is preferably at least several feet in length, and provide a remote termination for the cable and the extended conduit. The remote termination structure comprises a tubular shell having a tubular piston slidably mounted therein with a sealing ring therebetween. The electric cable is brought into the tubular piston where the cable armor and outer cable insulation is terminated. The terminated end of the cable armor is connected to the piston and beyond the cable armor resilient sealing means is clamped between the outer cable insulation and the tubular piston. Fluid under pressure in the extended conduit and the terminator shell bears against the incoming end of the sealed piston and presses an internally flared conical surface at the other end of the piston against a body of resilient sealing material which is backed up by a fixed stop in the terminator shell.

Figure 2:
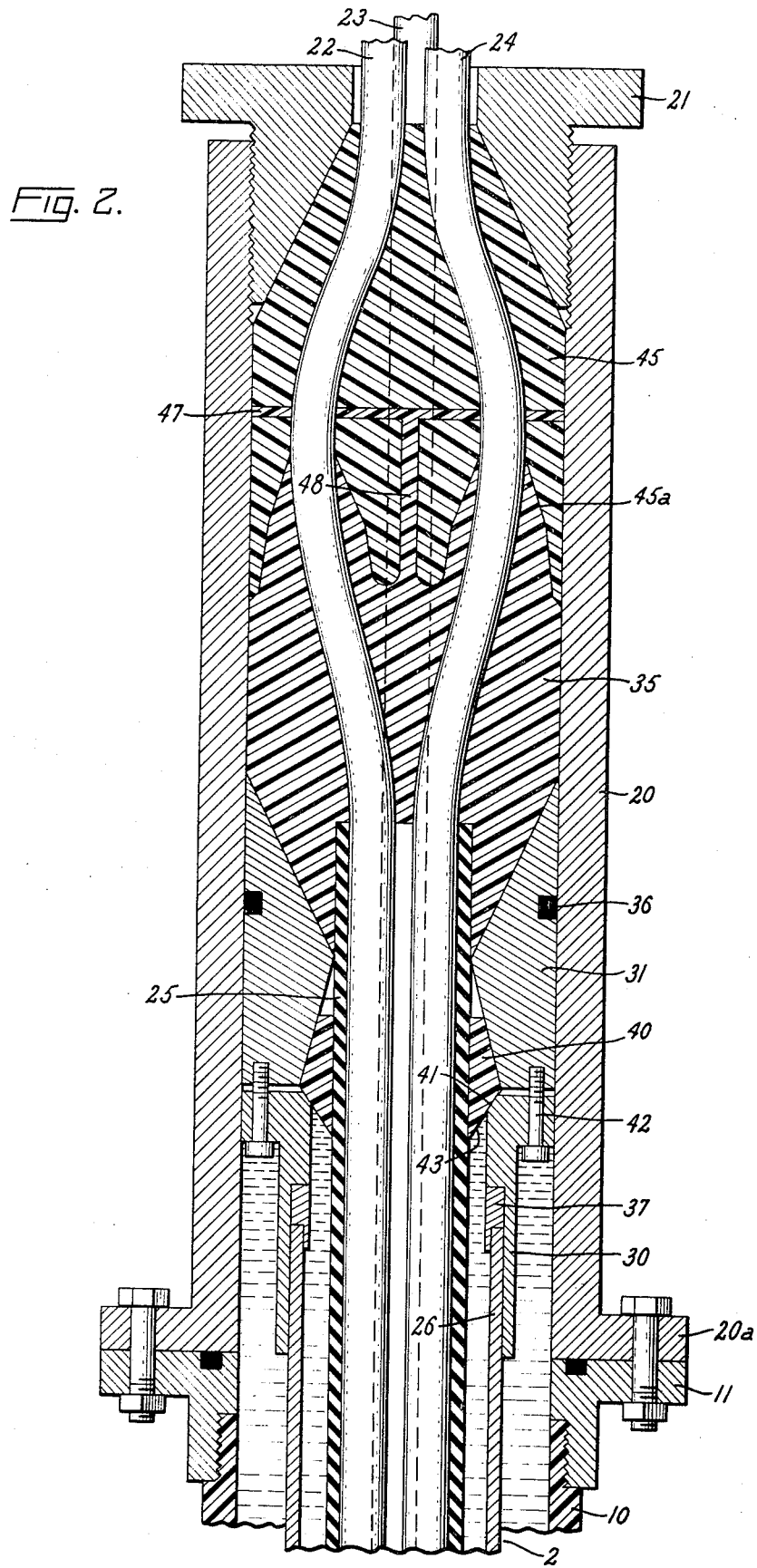

Our invention will be more fully understood and its several objects and advantages further appreciated by referring now to the following detailed specification taken in conjunction with the accompanying drawing in which:

FIG. 1 is an axial cross sectional view of a capped well casing and extended electric cable conduit having at its end a coupling flange for connection to the incoming end of a self sealing conduit and cable terminator shown at FIG. 2, and FIG. 2 is an axial cross sectional view of a self sealing conduit and cable termination structure constructed in accordance with our invention for connection to the extended conduit shown at FIG. 1.

Referring now to the drawing we have shown at FIG. 1 a well casing 1 providing a chamber at least several inches in diameter and extending into the earth for a distance of several hundred or several thousand feet to provide a fluid filled chamber. An armored and insulated electric cable 2 is positioned within the well casing 1 and emerges from it above ground level. Above ground the well casing 1 is capped at a well head comprising a flanged sealing collar 3 and a closure plate 4. Internally the well head collar 3 includes a positioning plate or disk 3a in parallel spaced relation with the closure plate 4 and against which a plurality of packing glands 5 and a pressure plate 6 are stacked. Aligned apertures in the closure plate 4, the positioning disk 3a and the intermediate sealing disks provide for entry of a water supply pipe 7 and a cylindrical cable ferrule 8 through the well head in sealing relation. In assembly a pressure annulus or ring 9 interposed between the pressure plate 6 and closure plate 4 and telescoped internally within the collar 3 applies pressure through the plate 6 to the packing glands 5 when the closure plate 4 is bolted in place. Water is supplied through the pipe 7 preferably under substantial pressure and fills the well casing 1.

Externally of the well head the cable ferrule 8 is provided with a threaded coupling 8a to which is connected a tubular extended cable conduit, shown as a flexible hose 10 having at its other end a flanged coupling 11. The electric cable 2 passes loosely through the ferrule 8 and the extended conduit 10 so that water under pressure fills the ferrule and the extended conduit up to and beyond the conduit coupling 11, as will be evident by referring now to FIG. 2.

At FIG. 2 we have shown in axial cross section a remote cable and conduit terminator bolted to the hose coupling flange 11. The terminator comprises a cylindrical metallic shell 20 having a mounting flange 20a at its lower or incoming end bolted to the hose coupling 11 and provided at its opposite outgoing end with a threaded end cap 21 centrally apertured to permit egress of the insulated cable conductors. In the illustrated embodiment of the invention we have shown a plural conductor cable comprising three conductors 22, 23 and 24 each separately enclosed in a suitable insulating jacket of rubber or the like, a common insulating tube or jacket 25 enclosing all the conductors and formed, for example of nitril rubber or the like and a tubular external metallic armor sheath 26 which is preferably flexible and formed of woven or spirally wrapped metallic strands in a manner well known to those skilled in the art.

The entire armored cable is brought into the terminator shell through the incoming end of the shell; the cable armor 26 and common insulating jacket 25 are terminated within the shell 20 and the insulated conductors 22, 23 and 24 pass out through the end cap 21 at the outgoing end of the shell.

Within the terminator shell 20 and adjacent its incoming end we provide a tubular slidable piston having a lower end or base 30 mechanically connected to the terminated end of the cable armor 26 and an upper or head portion 31 peripherially sealed to the terminated end of the insulating cable jacket 25. The two part piston 30-31 is preferably formed of metal with the two parts bolted together and is slidably mounted within the terminator shell 20 to enable water under pressure admitted to the lower part of the shell to move the piston into compressive relation with a body of resilient sealing material 35 interposed between the upper end of the piston and the closed outgoing end of the terminator shell. To prevent passage of liquid below the piston through the annular space between the piston and shell suitable sealing means, such as an O ring 36, is provided between the shell and the piston head.

The piston base 30 includes a tubular lower portion of reduced diameter to which the terminated cable armor 26 is mechanically connected, as by soldering of a ring 37 to the piston base and to the armor sheath.

The piston head 31 is formed internally with outwardly flared upper and lower conical surfaces forming oppositely directed mouths with a narrow throat therebetween. The terminal end of the insulating cable jacket 25 passes through the throat of the piston and the flared mouth of the piston head 31. Within the lower or incoming conical mouth of the piston head there is positioned a tubular resilient gasket 40 which bears internally against the insulating cable jacket 25 and is compressed into the lower conical mouth of the piston head 31 by engagement at its lower end with an upper internal conical surface 41 of the piston base 30. It will be evident that when the piston base 30 and piston head 31 are drawn together by connecting bolts 42 the intermediate gasket 40 is compressed axially into the conical lower mouth of the piston head and thus pressed radially against the outer surface of the cable jacket 25. This sealing effect is further enhanced by exposing a portion of the lower end of the gasket 40 to fluid under pressure admitted between the cable jacket 25 and the piston base 30 as at an annular surface 43.

The flared upper conical mouth of the piston head 31 bears against the lower end of the elastomeric sealing material 35 which may, for example, be formed of butyl rubber or the like. Within this upper conical mouth the cable jacket 25 is terminated. The separately insulated cable conductors 22, 23 and 24 extend through the body 35 of cast resilient gasket material and out of the terminator shell through the upper end cap 21. Within the terminator shell and between the resilient gasket 35 and the closure cap 21 we provide a fixed plug of rigid cast insulating material 45 which may, for example, be formed of epoxy resin or the like. Plug 45 is apertured axially to receive the three separate electric conductors 22, 23 and 24 and has an upper conical outer surface fitting into an internal conical surface in the end cap 21. At its lower end each of the three cable apertures through the stop plug 45 is provided with an outwardly flared conical mouth or entrance, as at 45a, within which the resilient gasket 35 extends. Preferably the rigid insulating plug 45 is also provided with a transverse passage 47 and a connecting axial passage 48 through which excess gasket material 35 may be forced.

It will now be observed that with the terminator assembled as illustrated at FIG. 2, fluid pressure applied to the bottom of the internal piston 30-31 and to a lower surface of the piston gasket 40 acts both to press the piston upwardly within the shell 20 and to further compress the gasket 40 within the piston. The gasket 40 is thus additionally sealed against the cable jacket 25 and the piston 30-31 is pressed by fluid pressure against the resilient sealing plug 35. The plug 35 is thus compressed between the flared upper conical mouth of the piston head 31 and the downwardly flared conical mouths of the rigid insulating stop plug 45. The gasket body 35 is thus pressed firmly against the cable conductors 22, 23 and 24 along the full length of their passage through the gasket 35 and is also sealed tightly against the inner wall of the terminator shell 20 where it engages the shell between the piston head 31 and the stop plug 45. In this manner fluid under pressure confined below the tubular piston 30-31 acts to increase pressure on all the gasket seals bearing upon the cable jacket 25 and the insulated conductors 22, 23 and 24 and effects a self sealing action which ensures that the pressurized fluid does not have access to the cable at any point above the terminated end of the cable jacket 25.

While we have shown and described a preferred embodiment of our invention by way of illustration, many modifications will occur to those skilled in the art and we therefore wish to have it understood that we intend in the appended claims to cover all such modifications as fall within the true spirit and scope of our invention.

What we claim as new and desire to secure by Letters Patent of the United States is:

1. Terminal apparatus for a pressurized fluid conduit and an enclosed electric cable having a fluid impervious insulating jacket which comprises, a tubular shell enclosing said cable and having an incoming end coupled to said conduit, an apertured closure cap in the opposite outgoing end of said shell, said cable jacket being terminated within said shell and said cable including an insulated conductor passing out of said shell through said closure cap, a tubular piston slidably mounted in said shell and embracing the terminal end of said cable jacket in sealed relation, and a body of resilient insulating material filling said shell between said piston and said closure cap and surrounding said insulated conductor whereby fluid pressure on the incoming side of said piston increases sealing pressure of said resilient body against said insulated conductor.

2. Terminal apparatus according to claim 1 which includes also a sealing ring interposed between said piston and said shell.

3. Terminal apparatus according to claim 1 for an electric cable having an external metallic armor sheath in which said piston is mechanically connected at its incoming side to a terminal end of said metallic armor sheath.

4. Terminal apparatus according to claim 1 wherein said tubular piston is axially flared outwardly at opposite ends to form oppositely directed mouths with a narrow throat therebetween, said insulating cable jacket traverses the piston mouth facing the incoming end of said shell and passes through said throat, and resilient sealing means is positioned within the piston mouth at said incoming end, whereby pressurized fluid in said conduit acts to compress said sealing means within said piston mouth at the incoming end and against said cable jacket.

5. Terminal apparatus according to claim 4 wherein said tubular piston comprises a head portion including said oppositely directed mouths and an annular base ring bolted to said head portion and engaging said sealing means in axial compression.

6. Terminal apparatus according to claim 1 wherein said tubular piston is axially flared outwardly at opposite ends to form oppositely directed mouths with a narrow throat therebetween, said insulating cable jacket traverses said throat and terminates in the piston mouth facing the outgoing end of said shell, and said body of resilient insulating material fills said piston mouth facing the outgoing end and is compressed by said mouth facing the outgoing end radially against said cable jacket and said insulated conductor.

7. Terminal apparatus according to claim 6 wherein said apertured closure cap is formed to provide a flared mouth facing the piston mouth at the outgoing end of said shell, a plug of rigid insulating material lies within said flared mouth of said closure cap, said plug being axially apertured to permit passage of said insulated conductor, and said body of resilient insulating material is compressed between said insulating plug and the opposing mouth of said piston.

8. Terminal apparatus according to claim 7 wherein said plug of rigid insulating material provides a flared mouth surrounding said insulated conductor and facing the piston mouth at the outgoing end of said shell, said body of resilient insulating material being compressed within and between the opposing mouths of said piston and said insulating plug.

* * * * *